Patented Feb. 9, 1932

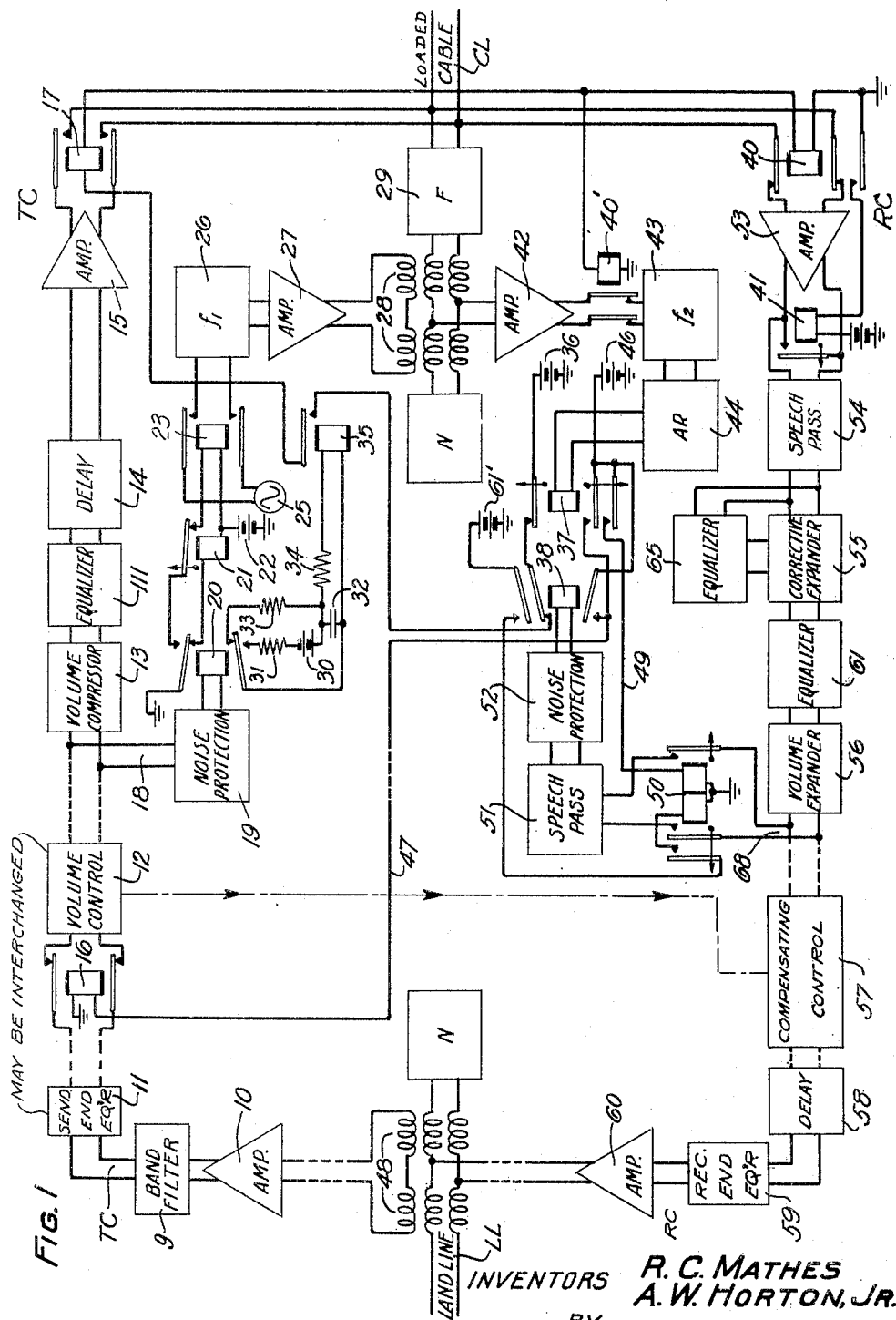

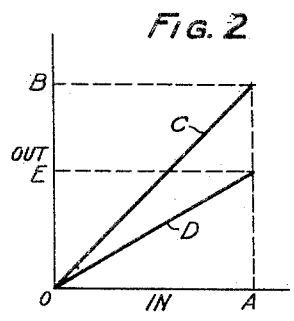
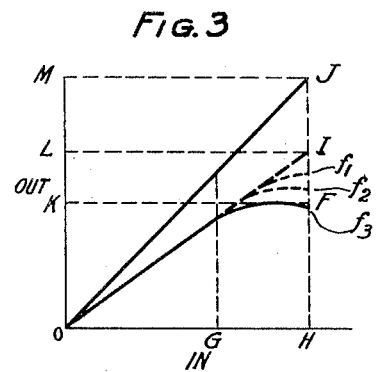
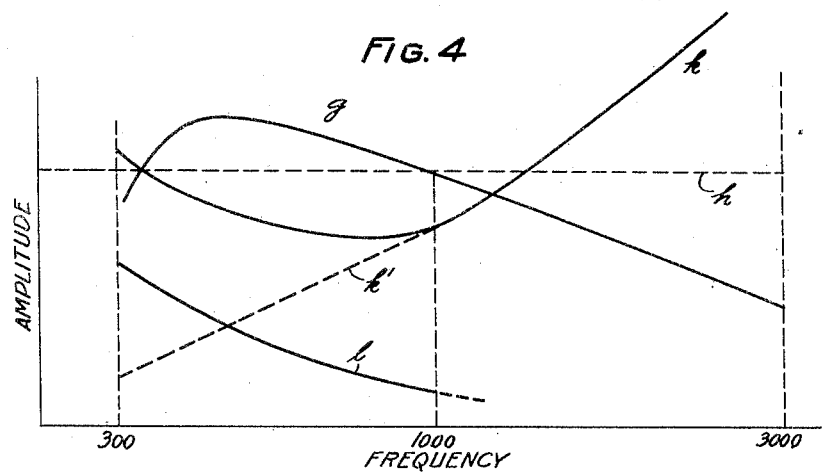
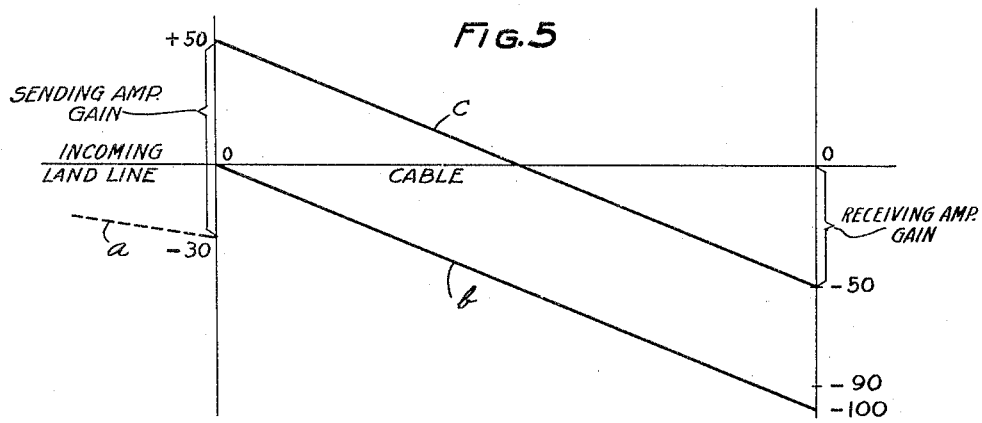

1,844,422

UNITED STATES PATENT OFFICE

ROBERT C. MATHES, OF WYOMING, AND ARTHUR W. HORTON, JR., OF EAST ORANGE, NEW JERSEY, ASSIGNORS TO BELL TELEPHONE LABORATORIES, INCORPORATED, OF NEW YORK, N. Y., A CORPORATION OF NEW YORK

CABLE TELEPHONY

Application filed December 9, 1929, Serial No. 412,612, and in Great Britain August 29, 1929.

This application is a continuation in part of our former application Serial No. 370,033, filed June 11, 1929 for cable telephony.

The present invention, while in many respects of general application, relates specifically to the problem of speech transmission over a long, deep-sea cable such as a submarine cable across the Atlantic Ocean. The invention will be described with particular reference to this problem, although it will be evident as the description proceeds that the invention in many of its broad features as well as in certain specific aspects is applicable to other types of transmission and is not, therefore, limited to the transmission of speech nor to submarine cable transmission. For example, high attenuation, the existence of noise, distortions, long time constant, etc., are difficulties commonly encountered to varying extents in radio transmission and in land line systems, as well as in deep-sea cable transmission; so that the invention, while adapted to a specific type of transmission system, is not to be construed as limited in scope thereto.

While the types of actual cable systems to which the invention is applicable may vary widely among themselves, a cable which will serve as an illustrative example is one consisting of a single span continuously loaded, preferably with a nickel-iron alloy of special composition, heat treatment and manner of application as disclosed, for example, in United States patents to G. W. Elmen 1,715,541 of June 4, 1929 and O. E. Buckley 1,586,874 of June 1, 1926. Such a cable may be assumed, for purposes of illustration, to have a total attenuation of the order of 100 db. and a time of transmission of one-quarter second.

To be useful for telephone communication, such a cable must be adapted for connection with land telephone systems, which may, for example, cover continents. In fact the entire talking circuit between two talking parties may be conceived of as comprising as a central portion the cable with its terminal repeating circuits, and as extensions of this, two land lines, one at each end of the cable, each of which may be hundreds or perhaps thousands of miles in length.

In such a system, among the outstanding transmission difficulties may be mentioned: the excessively large attenuation to currents of all frequencies; the distortion arising from the unequal attenuation produced in the lines, particularly in the cable, and also that produced by the various pieces of apparatus and by the cable, including the hysteresis effects in the loading material; the noise, which may have its origin in the cable or in the land lines or in circuits to which the cable and lines are exposed, and also in the individual pieces of apparatus; and various effects of a transient nature, principal of which are reflection, echoes, switching noises, earth currents, the different times of transmission of different frequencies, and the charging or discharging effects of the cable. Another difficulty, somewhat different in character from those mentioned above, is the time required to transmit from one talking party to the other.

Certain of these difficulties are functions of the circuits themselves, for example, certain kinds of noise, echoes, and the like, which yield for their solution in part at least to a proper circuit design. Others of the difficulties are of a more complicated nature and are functions of amplitude or frequency of the transmitted currents, or of time. Among these latter are the distortion due to unequal attenuation, that due to magnetic effects in loading and that caused by certain circuit transients.

Moreover, the difficulty of the problem is increased by the fact that an attempt to reduce trouble of one kind sometimes increases trouble of another kind. For example, the energy level to which the currents are adjusted at various points in the system cannot be determined from attenuation alone, but must be consistent with noise level and the distortion that is a function of energy level either in apparatus or circuits. For this reason especially, the multiplication of apparatus should be avoided where possible.

Certain of the factors which influence transmission remain substantially fixed so long as the circuit is not changed. For example, the transmission time for any given through-circuit will be substantially the same throughout the connection. The distortion produced in the system by the message currents, and that due to circuit constants will obviously be substantially the same for given adjustments throughout. The noise due to exposure will, however, vary widely. A practical system to give reliable transmission must of course be designed with reference to the worst conditions likely to be met in practice rather than with reference to ideal conditions.

It is an object of the present invention to provide speech transmission over a circuit of high attenuation and long transmission time, with a practical degree of understandability of the speech as received, notwithstanding the distortion within the system and the noise to which it is subject.

A related object is to effect this transmission in a two-way system operative one way at a time with provision for avoiding mutual lock-out and harmful effects of echoes and regeneration around a sending and receiving loop.

To effect two-way transmission, a switching system for each transmitter and receiver, under voice control, is preferably used, of the so-called "courier" type. Such a switching system per se is disclosed in United States patents of R. C. Mathes 1,829,805 and 1,829,806, November 3, 1931.

Features of the present invention comprise: suitable distortion-correcting, noise-protecting, volume regulating, and time-controlled circuits together with amplifying and switching means all to be described more in detail hereinafter.

Where the foregoing general description including the objects and features mentioned, refer to speech transmission, and while the following detailed description mentions speech throughout, applicants wish it to be understood that the invention comprehends transmission of wave components occupying a frequency band whether these waves represent speech or something else. Also the frequency band need not, of course, be continuous but may consist of superposed narrow bands, as in the case of multiplex carrier wave transmission.

For a detailed description of the invention reference will be made to the attached drawings.

Fig. 1 is a schematic diagram of a terminal circuit for the cable for connecting the cable to a land line; and Figs. 2 to 5 inclusive, show curves which will be referred to in describing the operation of the system.

In Fig. 1 the land line LL is connected to the cable CL by a four-wire circuit comprising the transmitting circuit TC for repeating waves received from the land line into the cable and a receiving circuit RC for repeating waves received from the cable into the land line.

Before proceeding with a description of the circuit of Fig. 1, reference will first be made to Fig. 5 which shows the levels to be maintained at different points in the system, these levels being given as illustrative and not as limiting. The levels in Fig. 5 are given with reference to an arbitrary zero level shown by the line 0—0 which may for convenience be taken as standard level for speech waves at a subscriber's station for normal telephonic transmission and reception. The conditions at the incoming end of the land line, shown in Fig. 1, are indicated at the left in Fig. 5. The dotted line $a$ indicates the level of speech received at the station in Fig. 1 from the land line, this level being indicated as 30 db. below zero level, although in practice this level may be anything between zero and a low value such as $-30$ db. If we assume a total mean effective cable attenuation of 100 db. speech at zero level at the transmitting end will be at a mean effective level $-100$ db. at the receiving end as indicated by the line $b$. The power of the noise picked-up in a cable and measured at the receiving end is assumed to have a mean effective level of about $-90$ db. It is assumed that an effective margin of 40 db. between speech and noise will give satisfactory articulation. In order to maintain this margin between speech and noise at the receiving end, it is necessary that the speech power at the transmitting end should be $+50$ db. which as indicated by the line $c$ of Fig. 5 will result in received speech at the level $-50$ db. giving a margin of 40 db. above noise. This means that the sending amplifier gain should be 80 db. and the receiving amplifier gain to bring the received speech to zero level must be 50 db. The total amplifier gain in the transmitting and receiving circuits of Fig. 1 must therefore be 130 db. Such a high gain would result in singing around the loop formed by the circuits TC and RC of Fig. 1, if this loop were closed, since it would be impossible to maintain at all times a line balance for the cable CL and for the line LL capable of introducing a loss of the order of 130 db.

For the above-noted reasons, suitable circuit establishing and disabling means, referred to for convenience as switches, are provided in the circuits TC and RC for connecting these circuits one at a time between the line LL and the cable CL. Similar switching circuits are, of course, provided at other stations to which the cable may be connected.

The switching devices for alternately disabling the circuits TC and RC for enabling two-way repeating between the line LL and cable CL might be controlled directly by speech currents traversing the system. However, it is preferable in accordance with the present invention to employ special switch controlling waves transmitted over the cable for controlling switches at a distant station, the switches at the originating station being controlled directly by the voice currents.

A description in general terms will first be given of the terminal circuits of Fig. 1, it being assumed that the cable terminates at a distant station in a circuit which is the counterpart of that shown in Fig. 1, and the nature of which will be clear from a description of Fig. 1.

Passing over, for the moment, the specific nature of the speed-amplifying, wave-shaping, volume-control, etc. devices, the speech incoming from the land line LL is amplified at 10 and is passed through band pass filter 9 which confines the transmitted band to the range 300 to 3000 cycles, passes through sending end equalizer 11, volume-control circuit 12, volume compressor circuit 13, equalizer 111, delay device 14, and power amplifier 15, to the cable circuit CL.

The contacts of relay 16 are normally closed and the contacts of relay 17 are normally open, so that relay 17 must be energized before the speech waves can actually pass into the cable. This is accomplished under control of the speech waves, a portion of which are diverted from the circuit TC at 18, are passed through noise protection circuit 19 and cause the release of relay 20. This noise protection circuit 19 may be of the type disclosed in application, Serial No. 356,136 of R. C. Mathes filed April 18, 1929, the relay 20 corresponding to the relay 28 of the said application, which is energized except when speech currents are impressed on the input circuit 18. Relay 20 when released under control of the speech waves, opens the circuit through slow-releases relay 21, this circuit extending from battery 22, upper armature and front contact of relay 20 to ground. Relay 21 does not, however, immediately release, but allows a circuit to be closed momentarily through its front contact and armature and back contact and upper armature of relay 20, this circuit extending through winding of relay 23 and battery 22. Relay 23 is energized for such time as relay 21 holds its armature attracted after its circuit is broken by the release of relay 20 as described. This time interval may be adjusted to any desired value within operating limits. As a result of this action of relays 20, 21 and 23, a circuit is closed at the front contacts and armatures of relay 23, for sending a "courier" wave of short duration from generator 25, through filter 26, amplifier 27, three-winding transformer connection 28 and filter 29 to the cable CL.

The courier wave from generator 25 may be a continuous wave of a convenient frequency, say 200 cycles per second and the length of the impulse that is sent may be a small fraction of a second. The purpose of this impulse is to effect at the distant terminal a switching operation to give the subscriber at line LL control of the complete system and to prevent operation of the switches at the distant terminal over the land line connected to that terminal.

Relay 20 when it was released by the initial speech waves also closed a circuit at its lower armature and back contact through battery 30, high resistance 31, and condenser 32, causing this condenser to charge slowly through the resistance 31. (In the attracted position of relay 20, condenser 32 was discharged through the circuit including the armature and front contact of the relay resistance 33.) After a suitable time interval which may be controlled by dimensioning the capacity of condenser 32 and the resistance of element 31, condenser 32 is fully charged and current from battery 30 flows through resistance 34 and relay 35 in sufficient amount to cause the energization of relay 35. Relay 35 in operating closes a circuit from battery 36, upper armature and back contact of relay 37, inner upper armature and front contact of relay 38 (normally operated), contact of relay 35, winding of relay 17 and windings of relays 40 and 40', causing the operation of relays 17 and 40 and 40'. Relay 17 in operating closes the circuit TC so that speech waves from the power amplifier 15 may pass into the cable. Relay 40 in operating opens the circuit RC so that none of the transmitting energy is allowed to pass into the receiving circuit. Relay 40' opens the courier receiving circuit so that it is unaffected by any courier current that might arrive at the station after it has been seized as a transmitting station.

The speech is delayed in the delay device 14 a sufficient time to permit relay 17 (and relay 40) to be fully operated before the speech arrives at the contacts of relay 17 so that none of the speech is lost by the action of "clipping". Relay 40 in operating closes a circuit through its lowermost armature and front contact, relay 41 and battery causing the operation of relay 41 which closes a short-circuit across the circuit RC, the purpose of which will be described later.

Relay 20 remains released as long as speech waves are being received from the land line LL, that is, as long as the subscriber continues talking, so that relays 35, 17 and 40 and 40' remain operated throughout this period. These relays also remain operated for such additional time as is required for the speech which is stored in the delay device 14 to have passed into the cable circuit. The time of the speech delay in device 14 will be described later on.

The operation at the distant terminal will be clear from considering the operation of the circuit of Fig. 1 in response to waves received from the cable CL. Speech initiated at the distant terminal sends out from that terminal an impulse of courier current from a generator similar to 25, but having a different frequency, for example, 250 cycles per second. The control circuits for effecting the transmission of this wave for a momentary interval may be identical to those described above in connection with this figure. This courier wave sent out from the distant terminal over the cable CL passes through the filter 29, is received and amplified at 42, and passes through filter 43 into amplifier-rectifier circuit 44, where it is rendered suitable for operating relay 37. Relay 37 in operating opens at its upper armature and back contact, the circuit that is adapted to be closed by relay 35, extending from battery 36 through normally closed front contact and upper armature of relay 38, for operating relays 17 and 40 and 40' under control of relay 35. This circuit being opened, prevents the energization of relays 17 and 40 and 40', if the subscriber on the land line LL should start talking after control of the connection has been initiated by speech from the subscriber at the far terminal. Relay 37 at its inner-lower armature and front contact closes a circuit from battery 46, conductor 47, and winding of relay 16 causing this relay to operate and open the circuit TC at a point between the elements 11 and 12. This insures that noise received from the cable or otherwise incident upon the receiving circuit RC which might find its way across the hybrid balance circuit 48 shall not affect the relay 20 and cause false operation of the terminal switching apparatus.

Relay 37 at its lowermost armature and front contact closes a circuit from battery 46, conductor 49, and right-hand winding of relay 50, causing this relay to operate and connect receiving circuit RC through speech pass filter 51 and noise-protection circuit 52 to relay 38. The receiving circuit is now in condition to receive speech from the distant cable terminal since relays 40 and 41 are both deenergized and relay 50 is energized preparing a circuit for the speech to control the operation of relay 38. Relays 37 and 50 are made slow-to-release to insure that they will remain operated until the speech which initiated the sending out of the courier wave from the distant terminal has arrived at the receiving station.

Speech arriving from the cable passes amplifier 53, speech pass filter 54, corrective expander 55, attenuation equalizer 61, volume expander 56, compensating control 57, delay device 58, receiving end equalizer 59, receiving amplifier 60 and into the land line LL where it is transmitted to the distant land line subscriber.

A portion of the speech currents are diverted into the circuit extending through armatures and front contacts of relay 50, filter 51, noise-protection circuit 52 and these cause the operation of relay 38, (elements 52 and 38 being identical with elements 19 and 20 described heretofore.) Relay 38 in releasing closes a holding circuit for relay 50 extending through battery 61', upper armature and back contact of relay 38, outer left armature and front contact of relay 50, and left-hand winding of this relay, so that relay 50 is held energized as long as speech continues to be received, notwithstanding the release of relay 37 which takes place at about the time the initial speech is received or slightly thereafter.

Relay 38 at its lower armature and back contact closes a substitute circuit from battery 46 through conductor 47, for holding relay 16 operated after relay 37 releases. Relay 38 at its inner upper armature and front contact opens the circuit controlled by the front contact of relay 35 so that this circuit remains opened after relay 37 releases.

When the talker at the distant cable terminal ceases talking, relays 50 and 38 remain operated for a sufficient time to permit the speech stored in delay device 58 to pass into the line LL and then these relays release, the cessation of speech releasing relay 38 and this in turn releasing relay 50.

The timing and the sequence of the operations above described are made such that complete control of the connection is obtained and maintained by the subscriber who first starts to talk, as is described also in the patents of R. C. Mathes referred to above, Nos. 1,829,805 and 1,829,806. While various timings and different sequences of operations are feasible, the preferred timing and sequence will now be indicated. Whichever talker initiates talking first will cause the arrival at the distant station of courier current before the courier from that station arrives at the station where the speech is first initiated. The arrival of such courier immediately energizes relay 37 which prevents the transmitting circuit from being made operative under control of relay 35, that is, the station at which the courier first arrives is maintained as a receiving station and is prevented from becoming a transmitting station. Assuming a transmission time T for the cable, it is preferred to delay transmission of the speech for an interval T after the courier is sent out. One advantage of this is that if both talkers start talking at nearly the same instant, the courier first to arrive at the distant station meets a condition of silence, for it arrives during the interval in which the speech at that station is being delayed. If there were no time interval between the sending out of the courier and the speech, in those cases where both talkers start talking very nearly simultaneously the courier first to arrive at the distant station would meet the condition that the transmitting amplifier 15 at the latter station is sending into the cable speech energy at high level, and this condition would render it more difficult to select the courier and insure cutting-off of the transmitter at that station. It is preferred therefore to delay transmission of the speech by an interval T after the sending out of the courier. This is accomplished by delaying the operation of relay 35 until time T, after the sending out of the courier, in order that power amplifier 15 shall remain disconnected from the cable for that interval. The delay produced by delay device 14 is made slightly greater than interval T to insure full operation of relay 17 before the speech reaches the break point in the circuit, so that "clipping" is avoided. The delay produced by device 14 may be of the order of .01 or .02 seconds greater than the time interval T. For a similar reason when the speech being received from the land line ceases, sufficient hang-over must be provided for relay 35 to hold relays 17 and 40 operated for an interval after cessation of the speech, equal to the time delay introduced at device 14 or preferably slightly greater time to prevent terminal clipping of words with weak endings. For example, this hang-over may be of the order of .1 or .2 seconds. When speech received from the cable ceases, relays 38 and 50 operate as described after a hang-over interval sufficient to suppress echoes from the land line, relay 16 being thereby held operated until after such echoes cease or have been reduced to an innocuous level. This hang-over time may be of the order of a few hundredths of a second depending upon the length of the connected land line.

At the cessation of speech received over the land line, during which time receiving circuit RC has been held inoperative, this circuit is again rendered operative to receive from the cable after an appropriate time interval, determined by the timing of relays 35 and 41. The conditions at this instant are that power amplifier 15 has been sending energy at high level into the cable circuit. This circuit is suddenly disconnected from the cable by release of relay 17 and circuit RC is almost simultaneously connected to the cable by the release of relay 40. If the entire receiving circuit RC were rendered operative at this instant, disturbances due to earth currents in the cable and echoes due to reflections taking place from structural irregularities in the cable might pass through the receiving circuit RC and into the land line and so on to the distant subscriber. To prevent this, relays 40 and 41 are timed so that relay 41 is not released until a short interval after release of relay 40. A short-circuit is thus maintained by relay 41 across the receiving circuit for a short interval after the amplifier circuit 53 is connected to the cable of relay 40. This interval allows the initial, usually strongest, earth currents and echoes received from the cable to be dissipated in the input of the amplifier circuit 53 before contact of relay 41 opens. The amplifier 53 contains sufficient loss to dissipate these ground currents and prevent disturbing effects from them. The release of relay 41 can be delayed for about time 3T after release of relay 40 since the receiving circuit RC need not be in receiving condition until the last of the speech from circuit TC has reached the other terminal of the cable and has there conditioned the transmitting circuit for operation and until the courier from that station has traversed the cable, followed T— time thereafter by the speech. Thus a considerable time is available in which to dissipate the cable earth currents.

Turning now to the transmission conditions of the system, a detailed description of the wave-shaping, volume-control, and similar elements will be given.

Referring to Fig. 4 curve $g$ may represent for illustrative purposes the energy distribution of speech. As is disclosed in United States patents of R. V. L. Hartley (Patent 1,737,843, December 3, 1929), and H. A. Affel No. 1,819,054, August 18, 1931, the energy distribution of random noise is in most cases different from that of normal speech, and it is pointed out in those applications that the signal-to-noise ratio may therefore be improved by distorting the speech so that its energy distribution brings the various separate components in the distorted speech waves on the average to higher energy levels than the corresponding noise components. An additional advantage is that in many, if not most, cases the distorted speech is of such shape that the difference between peak and average energy levels of the speech is reduced so that the speech may be sent at a higher average energy level without overloading the transmitting apparatus, particularly the amplifier. The horizontal line $h$ in Fig. 4 represents a condition where the normal speech $g$ has been converted to a constant energy level over the essential frequency range, assumed as 300 to 3000 cycles per second. As pointed out in the Hartley and Affel applications this type of distortion is advantageous in enabling the speech to over-ride the noise for the reasons briefly indicated above. The line $h$ may represent a higher transmission level than the curve $g$ but no greater load on the transmitting apparatus as regards producing overload distortion in the apparatus, as is disclosed in those applications.

The filter 9 passes the range 300 to 3000 cycles per second but suppresses both lower and higher frequency components. One reason for this is that distortion due to modulation in the cable loading is reduced as is disclosed in co-pending application of Buckley and Hartley Serial No. 341,623 filed February 21, 1929, (Patent 1,809,828, June 16, 1931.) A reason for suppressing the high frequencies is that singing around the terminal circuit TC—RC might occur at these high frequencies if they were not suppressed.

The attenuation of the cable for the higher frequencies is much greater than for the lower frequencies so that it is advantageous to amplify the high frequencies in the speech band more than the low frequencies before impressing the waves on the cable or after receiving them from the cable or at both the transmitter and the receiver. The distortion of the waves to compensate for the unequal attenuation is therefore such as to amplify the higher components to a greater and greater degree as the frequency increases over the band, as indicated by the right-hand portion of curve $k$.

Below 1000 cycles the curve $k$ might be extended as shown by the dotted portion $k'$, if it were not for the effect of cable noise. Cable noise in general may be due to static and resistance noise, the latter being relatively small. The resistance noise is distributed over the whole frequency range and is substantially "flat". Static as it exists in the atmosphere is likewise assumed "flat", but the shielding effects of sea water and cable sheath are more pronounced at higher frequencies, so that actually the noise will appear at the receiving terminal of the cable as distributed mostly over the lower frequency portion of the transmission range of interest. The curve $l$ in Fig. 4 may be assumed to represent roughly the distribution of cable noise at the receiving end in an illustrative example. If the frequencies in the lower speech range were sent out at a volume level indicated by the curve $k'$, this would give practically no margin over the noise, indicated by $l$. On this account it is preferably to raise the amplitude of the lower frequency components somewhat as indicated by the full line curve $k$.

The actual shape of the frequency amplitude curve of the transmitted speech will, of course, vary widely in each specific instance and the curves of Fig. 4 must be taken merely as illustrating the principles upon which to proceed in determining the amplitude-frequency distribution of the outgoing wave, and not as in any sense limiting. Moreover, it must be borne in mind that the curves of Fig. 4 show only the general shapes of the curves as regards relative amplitudes of the different frequency components and do not pretend to take account of level changes due to amplification nor to the effects of volume control or compression, but only the shaping due to the equalizer 11.

It is the purpose of the sending-end equalizer 11 to produce the requisite distortion in the transmitted waves to compensate for the distortion mentioned above in the detailed description of Fig. 4. It may and generally will be advantageous to make part of the correction for the distortion produced by the system at the receiving end as well as at the transmitting end. Fig. 1 indicates both a sending-end equalizer 11 and a receiving end equalizer 59 for this purpose.

Emphasis in the foregoing description has been placed upon the distortion produced in the cable itself. Other portions of the circuit such as the amplifiers and delay devices may also introduce a distortion of such character that this may, in part at least, be compensated for by the equalizers 11 and 59.

The circuits of the equalizers may be of any suitable design but are preferably of the constant resistance network type as disclosed in the patent to Zobel 1,603,305, dated October 19, 1926, and as more fully dealt with in the article by Zobel published in the Bell System Technical Journal for July, 1928 at pages 438 to 534 inclusive.

The volume control device 12 and the compensating control device 57 may be of the type disclosed in an application of Mitchell, Serial No. 329,203, filed Dec. 29, 1928, corresponding to British Patent 334,899, this being a type in which the volume of the waves sent out from the device is maintained substantially constant from instant to instant for varying levels of input volume. This is accomplished, for example, by providing a vacuum tube circuit in which the operating point on the tube characteristic is varied in accordance with the level of the incoming waves so as to vary the degree of amplification in the tube in such a way as to maintain the output level substantially constant.

As indicated in Fig. 1, the volume control 12 and the compensating control 57 are interrelated so that when the gain of element 12 is increased, the gain of element 57 is correspondingly decreased to keep the gain around the circuits TC and RC substantially constant. The manner of accomplishing this inter-control may be as disclosed in the Mitchell application referred to. It is not necessary so far as the present invention is concerned to employ an automatic volume control at 12 and 57 or to interconnect these, but the volume may be controlled manually in both the circuit TC and the circuit RC.

The volume compressor 13 may be of the type disclosed in prior application of R. C. Mathes, Serial No. 15, 227, filed March 13, 1925, (Patent 1,757,729, May 6, 1930), or British Patent 255,221, and the volume expander 56 may be of the type disclosed in the same Mathes patent, or in the British patent. The association of the volume control 12 and the volume compressor 13 as disclosed in Fig. 1 is also disclosed and claimed in prior application of R. C. Mathes, Serial No. 350,971, filed March 29, 1929, (Patent 1,816,599, July 28, 1931).

In accordance with a feature of this invention, the circuit 18 for operating the switching devices is derived from the transmitting circuit TC at a point following the volume control 12 and specifically at a point between volume control 12 and volume compressor 13. The connection of the circuit 18 at this point makes for reliable operation of the switching circuits. For example, it is requisite that these switching circuits be operated by all incoming speech from the land line whether this consists at any instant mostly of the relatively strong vowel components or the relatively weak consonant components. Sending-end equalizer 11 distorts the waves as disclosed to reduce both the strong and weak speech components to a more nearly constant energy level, and the volume control 12 reduces the speech of strong talkers and of weak talkers to substantially constant volume level. Connection of the voice control circuit 18 at the point indicated, therefore insures substantially constant operating conditions for this circuit. Connection of the noise protection circuit 19 effectively protects the voice control circuits from false operation by noise received over the land line LL.

Returning to the consideration of volume compressor 13, the action of this circuit is diagrammatically indicated in Fig. 2, where input energy levels are indicated by abscissæ and output energy levels by ordinates. Assuming, for example, that the incoming energy has instantaneous values between the limits O and A, if the volume compressor were omitted, then the volume variations of the waves impressed on the delay device 14 would be the same, as indicated by the range OB, the characteristic C being drawn at 45 degrees. By providing a characteristic D, however, the volume range of the different components in the speech may be reduced from the range OB to some value OE.

If the relative amplitudes of the higher frequency components in the waves as they leave volume compressor 13 is insufficient, an equalizer 111 may be provided to insure that the high frequency components are sufficiently emphasized in the cable. This equalizer may be constructed similarly to equalizer 11 to favor the higher frequency components to a proper degree.

The delay device 14 may be of any suitable type for delaying transmission of the outgoing speech wave a requisite time, and may be electrical, mechanical or acoustical in nature. For example, this device may be constructed as disclosed in R. C. Mathes Patent No. 1,696,315, dated December 25, 1928, or that disclosed in Nyquist Patent 1,607,687, dated November 23, 1926, or may be any other suitable type of delay device.

The amplifier 15 is a power amplifier providing the requisite gain and power capacity to meet the conditions already discussed earlier in this application.

Referring to the receiving circuit RC, the receiving amplifier 53 may be of any suitable type having the requisite gain.

The speech pass filter 54 is a band pass filter capable of transmitting the waves received from the cable and representing speech, but excluding the courier waves. This filter as well as the other filters employed in the system may be designed in accordance with the disclosure of U. S. patent to G. A. Campbell, 1,227,114, dated May 22, 1917.

The volume expander 56 may be similar in construction to the volume compressor 13 but is adjusted to give the converse variation. For example, referring to Fig. 2, the expander is adjusted to change from an input volume range such as OE to a larger output range such as OA.

For ease of design, it is preferable to control the characteristic of the entire system between the compressor 13 and expander 56 so that the latter may be the simple converse of the former in its action. Supposing that compressor 13 reduces volume by a square-root relation, expander 56 may be made to square the input volumes and thus restore the volume relations to their originals. This simple converse relationship cannot exist however where there is a material amount of distortion between elements 13 and 56, and it is therefore advantageous to correct for the distortion before reaching the expander 56 in order that the over-all distortion between the compressor and expander may be as small as possible. For this purpose attenuation equalizer 61 and corrective expander 55 are placed ahead of volume expander 56.

The attenuation equalizer may be designed in accordance with the Zobel patent and article above referred to, or in any other suitable manner, to correct for the relatively large attenuation suffered by the high frequency components in traversing the system. That is, it discriminates against the low frequency components and in favor of the high frequency components of the transmitted waves in complementary manner to the system. Where an equalizer 111 is used at the sending-end as described above, the equalizer 61 should be designed to compensate for the distortion introduced by network 111 as well as for the other distortions in the system, referred to.

The corrective expander 55 is particularly needed where the cable is of such character as to introduce a volume compression effect which is non-linear. For example, referring to Fig. 3 in which input instantaneous volume is plotted as abscissæ against instantaneous output volume as ordinates, the curve OF may represent the volume compressor action of a cable loaded with a magnetic material. The hysteresis of the loading material reduces high volume components more than low volume components and produces a non-linear effect somewhat as indicated by the curve OF. The corrective expander 55 may be similar in construction to the volume expander 56 already described, but is adjusted to have a non-linear input-output relation over at least a portion of the volume range such as GH so as effectively to make the over-all input-output volume relations for cable and expander of the form shown by the straight line OI. Instead of providing a corrective expander 55 and a volume expander 56 as separate elements, these may be combined in one circuit to possess a characteristic such as to give an over-all characteristic for the cable and expander as indicated by the curve OJ so that the volume is expanded in one operation to correct both for the sending-end compressor 13 and the compression produced in the cable.

The corrective expander 55 is shown provided with an equalizer 65 the purpose of which will now be described. The cable acts to compress volume not only as a function of the volume level but also as a function of frequency. The higher frequency components undergo a greater volume compression in the cable than do the lower frequency components. It is advantageous, therefore, to place an auxiliary control on the volume expander 55 to make the corrective expansion of the volume a function of frequency in such manner as to compensate fully for the cable compression. Referring to Fig. 3, the dotted curves between lines OF and OI represent the volume compression at different frequency levels $f_1$, $f_2$ and $f_3$ of which $f_3$ is the highest.

This equalizer 65 may be designed similarly in general to equalizer 61, that is, it emphasizes the higher frequency components of the transmitted waves and causes the corrective expander to raise to an input-output relation OI all volume levels, at all frequencies in the transmitted range. To do this, a volume level in the range GH at a high frequency $f_3$ must be raised more than the same volume level at some lower frequency such as $f_2$, etc. Referring to Fig. 1 of R. C. Mathes' application, Serial No. 15,227, filed March 13, 1925, (Patent 1,757,729, May 6, 1930), the auxiliary control 65 may take the form of an attenuation equalizer inserted in series in the control circuit between filter 12 and the rectifier 13 of that figure, so that the rectified current resulting from the higher frequency components of the speech waves is intensified relative to that resulting from the lower frequencies.

It will be of interest before proceeding further to trace through the general wave shapes existing at various points in the system. At the output of sending equalizer 11 the waves are distorted to make the higher frequencies have a relatively high amplitude, and this statement also applies to the waves leaving the volume compressor 13. After traversing the cable, the high frequency components are reduced in amplitude much more than the low, but attenuation equalizer 61, and also the corrective volume expander 55 with its auxiliary control 65, bring the relative amplitudes and volumes of the high and low frequency components of the waves to the same relations (as near as they may be) as they had at the output of element 13 at the sending station. The waves entering the volume expander 56, therefore, are over corrected in that the high frequency components are stronger relative to the low frequency components, than is the case in the original speech waves, since the waves are of the form resulting from the distorting action of equalizer 11.

Equalizer 59 must therefore be provided to restore the frequency amplitude relations to those of speech. This equalizer is therefore designed to introduce a distortion complementary to that of sending-end equalizer 11, and it may be designed in the manner and be of the same type as that described above for the design and construction of equalizer 11.

Equalizer 59 in reversing the process of distortion performed by sending-end equalizer 11 restores the waves to recognizable speech and assists in producing a favorable signal-to-noise ratio since it attenuates noise and speech components at the various frequencies such as to reduce the masking effects of noise and render the speech more understandable, in the manner pointed out in general in the Hartley and Affel patents already referred to.

The delay device 58 may be identical with the device 14 or any other suitable type. The receiving amplifier 60 provides additional gain for the waves prior to their transmission on the land line.

The noise protection circuits 19 and 52 operate on a frequency discriminating basis to respond to waves having the characteristics of speech, but to be unoperated by noise. The margin of speech over noise as regards the protection of the voice operated circuits is greater before the waves pass through the volume compressor 13 than afterward so that it is advantageous to connect the noise protection circuits ahead of the volume compressor. Likewise in the receiving circuit the margin against noise is greater following the expander 56 than ahead of it, so that it is advantageous to connect noise protection circuit 52 at the point indicated. It is also advantageous to have the control circuits 18 and 68 follow the equalizers 11 and 61 respectively, since these equalizers emphasize components of high frequency, which are the weakest, and make operation of the control circuits more certain.

In the system as disclosed in Fig. 1 it will be observed that the transmitting and receiving circuits TC and RC are directly connected to the cable circuit CL and do not employ a hybrid or differential balancing connection. This direct connection is preferable, since a hybrid connection sends but half the energy into the cable. If a hybrid connection were used, therefore, the power output of sending-end amplifier 15 would need to be of the order of twice that necessary without a hybrid connection. In the interest of preventing false operation of the switching circuits, however, and to provide sharp discrimination between speech and courier currents, the hybrid balance 28 with cable balancing network N is preferably employed for the courier terminal circuits. This hybrid balance together with the frequency discrimination provided by the filters 26 and 43 and the use of different courier frequency waves for each terminal, provides a high degree of discrimination between speech or noise currents and the courier currents.

The filter 29 passes the courier waves but not the speech. It also provides a high impedance to speech waves so that the cable is properly terminated for both the courier and speech.

For simplicity of disclosure the circuits have been shown in Fig. 1 as being opened or closed by relays 16, 17, 40, 40' and 41 and in the control circuits themselves by relays 20, 21, 23, 35, 37, 38 and 50. However, the invention contemplates the use of any suitable type of circuit disabling and circuit establishing devices at these points.

The provision of a disabling means in the circuit TC at a point ahead of the volume control is advantageous in that it prevents operation of the volume control by noise or by echoes from the land line during the receiving period. Such operation by noise would disturb the volume control adjustment of both the transmitter and receiver since these controls are tied together, and would necessitate a readjustment when speech again starts in the circuit TC.

As illustrated in Fig. 1, the sending-end equalizer 11 precedes the volume control 12. While this order of connection of these two elements in the circuit is in general to be preferred, the volume control 12 may be connected ahead of the sending-end equalizer 11 and this order may actually be advantageous in certain systems, depending on the character of distortion that must be provided in the equalizer 11.

Consider first that the equalizer design is such as either to make the amplitudes of all of the speech components alike or to result in higher amplitude in the low frequency components. When this is the case it is advantageous to have the volume control 12 connected on the output side of sending-end equalizer 11. The operation of the volume control will then be determined in general by the magnitude of the low frequency components. This is desirable since the low frequency components in normal speech have the greatest energy. This results in a proper operation of the volume control such as to maintain incoming sounds of different volume and frequency distribution in proper relation to each other.

In the case, however, where the equalizer design is such as to make the higher frequency components of the speech of higher amplitude, it is advantageous to have the volume control ahead of the equalizer. If the reverse order were used, the operation of the volume control may be determined by the high frequency components of the speech waves. The relations between the high frequency components of different sounds of normal speech is different from that of low frequency components and hence the volume control may alter the volume relations between sounds in an undesired manner, if the equalizer precedes the volume control. By placing the volume control first, however, the operation of the volume control is still determined by the relatively large energy of the low frequency components of the incoming speech.

No attempt is made in Fig. 1 to show the actual location in space of the different pieces of apparatus. It is within the invention to locate all of the apparatus of Fig. 1 at the same geographical point or at different geographical points as may be most advantageous in any practical case. For example, all of the apparatus in Fig. 1 to the left of relay 16 and compensating control 57 including the terminal of the line LL may be located at a geographically distant point from the remainder of the apparatus. Likewise, by extending the control lead 47 the volume control 12 and the compensating control 57 may be located, together with the apparatus shown to the left of these two elements, at a geographically distant point. The circuits TC and RC would then in either case be extended as a four-wire line between the two distantly located points.

The circuits TC and RC adjacent the terminal of the land line LL are shown by dotted lines to indicate that the land line terminal including hybrid coil 48 and balancing network N may be located at a geographically distant point, even though all of the rest of the apparatus shown in Fig. 1 is at the same or different geographical locations. This may mean, for example, that the apparatus shown in Fig. 1 is located at three geographically separated points. For example, the terminal of the two-wire line LL may be at Chicago. The apparatus in circuit TC, including filter 9 and sending-end equalizer 11 together with the apparatus in circuit RC, including equalizer 59 and delay network 58, may be located at New York, while the remainder of the apparatus in Fig. 1 may be located at a distant point, such as at Newfoundland. As indicated hereinbefore there may also be located at New York (in the example given) the relay 16 and volume control 12 of the circuit TC and the compensating control 57 of the circuit RC.

It will be understood that suitable amplifiers, corrective networks, echo suppressors, etc. may be provided in the land line LL or in extensions of the same, as well as in the extended circuits TC and RC referred to above. One advantage of extending the four-wire circuits TC and RC to a remote distance in the case of a long connection is that the operating time may in some cases be reduced by reducing the number of echo suppressors that are required and thereby reducing the total hang-over time of the relays as well as reducing the liability of mutual lockout.

Certain deviations from the system as schematically indicated in Fig. 1 have been mentioned above. Other alterations or modifications will readily occur to those skilled in the art, in connection with adapting the invention to different transmission requirements. The invention is not to be construed therefore as limited to the specific disclosure but its scope is defined in the appended claims.

What is claimed is:

1. In a system for transmitting waves occupying a band of frequencies over a transmission path of high attenuation which has a distorting characteristic, wave shaping means and volume control means connected to said path operating on input waves of non-linear energy-frequency characteristics and of variable volume level to reduce them to waves of substantially linear energy-frequency characteristic on a logarithmic scale and substantially constant volume, except for such departures from linearity as may be required to compensate for noise or distortion in the system.

2. In a signal transmission system for transmitting waves of a band of frequencies over a path subject to distortion, a network in the input circuit to the path having an amplitude-frequency characteristic such as to reduce all frequency components of the outgoing signal wave to an amplitude level differing from the same level for all frequencies by such amounts as to counteract the distortion of the circuit, and means also in the input circuit to the path operating under control of the impressed waves for reducing the outgoing waves to substantially constant volume level.

3. In a signal system for transmitting waves comprising a band of frequency components over a circuit which distorts the waves, means for predistorting the signal waves in a manner to counteract the distortion produced by the circuit, and means to reduce all outgoing signals to substantially the same volume level.

4. In a system for transmitting waves of a band of frequencies over a path which distorts the wave form, an equalizer circuit in the input circuit to said path for predistorting the waves in a manner to compensate for the distortion in said path, and a volume control circuit between said equalizer and said path for reducing incoming signals of different level to substantially constant level of waves outgoing to said path.

5. The combination with a deep sea telephone cable of means in the transmitting circuit to the cable for distorting outgoing speech waves to compensate the distortion produced by the cable and for reducing outgoing waves of varying volume to substantially constant volume level, and means in the receiving circuit of the cable for restoring received waves to recognizable speech.

6. In a signaling system for transmitting waves of a band of frequency components over a path subject to distortion, an input circuit for said path comprising the following elements leading to the path in the order named; a wave-shaping circuit for compensating for the distortion produced in the path; a volume control circuit for reducing incoming signals of different amplitude level to substantially the same level for transmission over the path; and a circuit control means for establishing the input circuit to the path, said last means being operated under control of the transmitted waves.

7. A system according to claim 6, comprising a circuit derived from the input circuit to the path at a point between said volume control and said circuit disabling means for diverting a portion of the transmitted waves and utilizing them to operate said means.

8. A system according to claim 6, including a transmission delay element between the volume control and said means, and a circuit derived from said input circuit at a point between the volume control and said transmitting delay element for diverting a portion of the transmitted waves for operating said means.

9. In a system for transmitting waves of a band of frequencies representing signals over a path having an appreciable transmission time, means under control of waves incoming to the system for sending a circuit-controlling impulse over said path, a circuit controller also controlled by said means for establishing an input circuit to said path for said signal waves, and a delay device for preventing the establishment of said input circuit to said path after the sending of said switching impulse, for a time substantially equal to the transmission time of said path.

10. A system according to claim 9 including a delay device in the input circuit for delaying the arrival of the signal waves at the point of establishment of said input circuit for a time slightly longer than the transmission time of said path.

11. An interconnecting circuit between a noisy line and transmission path for receiving waves representing speech or similar signals from said line and retransmitting waves representing said speech over said transmission path, said transmission path producing distortion in the transmitted waves, said interconnecting circuit including a wave-shaping network for compensating for the distortion produced by said transmission path, and a means for effectively opening and closing said interconnecting circuit under control of the waves being transmitted, a control circuit for said last mentioned means, and a noise protection circuit in the input to said control circuit for protecting said means from operation by noise on said line while permitting the operation of said means under control of said waves representing speech.

12. An interconnecting circuit for repeating waves received from a line subject to noise into a transmission path which distorts the waves, comprising a wave-shaping circuit connected to said line for altering the energy-frequency relations of the wave components to compensate for the distortion produced in said path, a volume control circuit connected to the output of said network for reducing waves received from said line to substantially the same volume level, a delay device connected to the output of said volume control for delaying transmission of the waves for a short interval of time, means for effectively opening and closing said interconnecting circuit at a point between said delay device and said path, a circuit for diverting a portion of the waves on the output side of said volume control circuit and utilizing said waves to operate said means, and a noise protection circuit in said diverting circuit for protecting said means from false operation by noise energy on said line.

13. A two-way terminal circuit for a transmission path which is subject to noise, comprising a transmitting and a receiving branch, and means under control of both transmitted and received waves for effectively opening and closing at least one of said branches, means for also controlling said first means by the current other than said signaling waves, and means for protecting said first means against operation by noise energy.

14. In a transmitting circuit for a system including a loaded transmission line, means for shaping the waves in said transmitting circuit to compensate for distortion on said line, said means comprising: a circuit for reducing certain of the large energy low frequency components to a low energy level to reduce modulation distortion in the line, a circuit for emphasizing the high frequency components relative to the low frequency components to compensate for the unequal attenuation of the different frequency components by the system, and a volume control to reduce input waves to substantially constant volume level.

15. A system according to claim 14 including means to shape the waves dependent upon the noise characteristic of the line whereby the wave components are made to have an amplitude margin over noise.

16. In a deep sea cable system for transmitting waves of a band of frequency components, a sending-end equalizer for predistorting the outgoing waves to compensate for cable noise and distortion, and a volume control between said equalizer and the cable for reducing outgoing waves of different volume level to substantially the same volume level.

17. A system according to claim 16 including a circuit-establishing means between said volume control and the cable, and a circuit connected to the output side of said volume control for controlling said means by the transmitted waves.

18. In a deep sea cable system for transmitting waves of a band of frequency components, a volume control for reducing outgoing waves of different volume level to substantially the same volume level, and a sending-end equalizer between said volume control and the cable for predistorting the outgoing waves to compensate for cable noise and distortion.

19. The combination with a transmission circuit which acts as a volume compressor on the transmitted waves, of means for expanding the volumes of the transmitted waves to compensate for such compression.

20. In a receiving circuit for a loaded transmission line which acts as a volume compressor for the transmitted waves, a volume expander for compensating for such compression.

21. In a transmission line ssytem in which the line acts as a volume compressor on the transmitted waves, means for compressing the volume before transmission over said line, and means at the receiving point for expanding the volumes of received waves to compensate for the compression produced by both the line and said compressing means.

22. The combination with a transmission line which compresses the volume of transmitted waves unequally over the volume range, of a volume expander with an unequal expanding characteristic over the volume range such as to compensate for the volume compression produced by said line.

23. The combination with a transmission line which compresses the volume of transmitted waves unequally as a function of frequency within the transmitted frequency range, of a volume expander having an unequal volume expanding frequency characteristic such as to compensate for the volume compression produced by said line.

24. In a receiving circuit for a transmission line having unequal attenuation for wave components of different frequency, an equalizer for relatively emphasizing the components that are most highly attenuated by said line, and a volume expander following said attenuation equalizer, in said receiving circuit.

25. In a transmission system including a line having unequal attenuation for wave components of different frequencies, a wave shaper and volume control in a transmitting circuit to said line, and a wave shaper in a receiving circuit from said line, said last mentioned wave shaper making up for the unequal attenuation by said line and restoring the wave shape to approximate that at the output of the volume control at a distant station on the line, a circuit-establishing means connected to said transmitting circuit on the output side of said volume control, another circuit-establishing means connected to said receiving circuit on the output side of said receiving shaper, said circuit-establishing means being operated under control of transmitted and received waves, respectively.

26. In a receiving circuit for a deep sea cable system, the following elements in the order named, beginning nearest the cable: an attenuation equalizer, a volume expander, a volume control, and a wave-restoring distorter.

27. A circuit according to claim 26 in which a signal operated circuit controller is connected to derive control waves from the output circuit of said volume expander.

28. In a deep sea telephone cable system employing a sending-end wave shaper in a transmitting circuit to improve the energy frequency relations of speech waves for transmission over the cable, an equalizer in a receiving circuit for counteracting the unequal attenuation of said waves by the cable, a receiving end wave shaper in the receiving circuit following said equalizer for performing the reverse alteration of that performed by the sending-end wave shaper, and circuit controllers connected to receive control energy respectively from the transmitting circuit at a point following said sending-end wave shaper and from the receiving circuit at a point between said equalizer and said receiving end shaper.

29. In a receiving circuit for a submarine cable, said receiving circuit adapted to be made operative and inoperative alternately under control of signals traversing the system, a plurality of disabling means in said receiving circuit at electrically separated points and means operating under control of signals for actuating said plurality of means in sequence, with sufficient intervening time to permit disturbing energy to be dissipated, whereby said receiving circuit is made operative at a point nearest the cable first and at a more remote point subsequently.

30. In a receiving circuit for a submarine cable, means for protecting the receiving circuit from earth currents from the cable comprising a plurality of disabling means rendering the circuit non-operative at electrically separated points along said receiving path and in sequence under control of signals traversing the system with sufficient intervening time to permit disturbing energy to be dissipated.

31. In a two-way terminal circuit for a deep sea telephone cable, transmitting and receiving paths, control circuits operated in response to speech waves in the transmitting path for disabling said receiving path at a point adjacent the cable and at a point remote from the cable, said control circuits operating, when rendering the receiving path operative, to establish the path first near the cable and later remote from the cable whereby earth currents are dissipated in the receiving path before the path as a whole is made operative.

32. In a two-way terminal circuit for a deep sea telephone cable, a transmitting and a receiving speech path adapted to be connected to the cable and rendered operative alternately, circuits for sending to and receiving from the cable waves other than speech waves, and a balanced hybrid connection for connecting said sending and receiving circuits to the cable in conjugate relation to each other.

33. In a two-way terminal circuit for a deep sea telephone cable, a speech transmission path and a speech reception path adapted to be alternately operatively associated with the cable, a sending courier wave circuit and a receiving courier wave circuit connected, in conjugate relation to each other, to said cable, said courier waves occupying frequencies outside the range of speech currents traversing the cable, and a filter in the courier wave connection to the cable for freely passing the courier waves but suppressing speech waves, said filter having a high impedance termination at speech frequencies.

34. A system according to claim 11 in which said wave-shaping network is located at a geographically distant point from the terminal of the said transmission path and from said means, said control circuit and said noise protection circuit.

35. A system according to claim 12 in which said wave-shaping circuit and volume control circuit are located at a geographically distant point from said relay device, wave diverting circuit and noise protection circuit.

36. A telephone system comprising a subscriber station, a two-wire circuit connected thereto, terminating in a long four-wire circuit connecting geographically separated points, said four-wire circuit terminating at the end remote from said subscriber station in the transmitting and receiving circuits, respectively, of the combination as claimed in claim 5.

37. A telephone system comprising a deep sea telephone cable, a four-wire termination therefor, a long four-wire telephone line connected to said four-wire termination, and a subscriber's line adapted to be connected to the four-wire telephone line at its remote end, said four-wire termination comprising sending and receiving branches each containing circuit control means operated under control of speech waves traversing the system for alternatively effectively connecting the sending and receiving branches to said cable, and means in said four-wire circuit geographically remote from said cable termination including a sending-end equalizer for distorting outgoing waves to compensate for distortion in said cable and a receiving end equalizer for restoring received distorted speech waves to recognizable form for retranmission over the receiving side of said four-wire line.

38. A system according to claim 37 in which there is also located in the sending side of said four-wire line leading to the cable, at a geographically remote point from the cable termination, a volume control circuit for reducng impressed speech waves of different volume level to substantially constant level for transmission to said cable termination.

39. A system according to claim 37 in which said four-wire line contains at a point geographically remote from said cable termination a volume control circuit in the side of the line leading to the cable and a compensating control in the opposite side of the line.

40. A system according to claim 37 in which the said sending-end equalizer and the said receiving end equalizer are located at a point between the subscriber's line and the cable termination and geographically remote from each.

In witness whereof, we hereunto subscribe our names this 5th day of December, 1929.

ROBERT C. MATHES.
ARTHUR W. HORTON, Jr.